United States Patent
Lai et al.

(10) Patent No.: US 7,776,776 B2
(45) Date of Patent: Aug. 17, 2010

(54) METHOD FOR PREPARING CATALYST PLATINUM SUPPORTED ON LITHIUM COBALT OXIDE

(75) Inventors: Hung-Chun Lai, Dacun Township, Changhua Country (TW); Ru-Shi Liu, Hsinchu (TW); Biing-Jyh Weng, Linkou Township, Taipei County (TW); Ming-Chen Hwang, Taipei (TW); Ching-Yuan Hsieh, Taoyuan Hsian (TW)

(73) Assignee: Chung Shan Institute of Science and Technology, Armaments Bureau, M.N.D., Taoyuan County (TW)

( * ) Notice: Subject to any disclaimer, the term of this patent is extended or adjusted under 35 U.S.C. 154(b) by 195 days.

(21) Appl. No.: 11/511,243

(22) Filed: Aug. 29, 2006

(65) Prior Publication Data

US 2008/0058204 A1 Mar. 6, 2008

(51) Int. Cl.
*B01J 31/00* (2006.01)
*B01J 37/00* (2006.01)
*B01J 27/06* (2006.01)
*B01J 27/128* (2006.01)
*B01J 23/44* (2006.01)
*B01J 27/13* (2006.01)
*B01J 23/40* (2006.01)
*B01J 23/42* (2006.01)
*C08F 4/02* (2006.01)
*C08F 4/60* (2006.01)

(52) U.S. Cl. .................. 502/104; 502/107; 502/224; 502/229; 502/230; 502/326; 502/339

(58) Field of Classification Search .............. 502/104, 502/107, 224, 229, 230, 326, 339
See application file for complete search history.

(56) References Cited

U.S. PATENT DOCUMENTS

| 3,414,371 | A * | 12/1968 | Rogers | 423/594.5 |
| 6,974,533 | B2 * | 12/2005 | Zhou | 205/264 |
| 7,303,594 | B2 * | 12/2007 | Cintra et al. | 29/623.1 |
| 2001/0022960 | A1 * | 9/2001 | Kojima et al. | 423/657 |

OTHER PUBLICATIONS

"PtRu-LiCoO2—an efficient catalyst for hydrogen generation from sodium borohydride solutions," Palanichamy Krishnan, et al. Journal of Power Sources 143 (2005), pp. 17-23.*

"LiCoO2-based catalysts for generation of hydrogen gas fro sodium borohydride soltuions," O. V. Komova et al. Catalysis Today (2008), pp. 1-6.*

(Continued)

*Primary Examiner*—Patricia L Hailey
(74) *Attorney, Agent, or Firm*—Rosenberg, Klein & Lee

(57) ABSTRACT

The present invention relates to a method for preparing catalyst platinum supported on lithium cobalt oxide for sodium borohydride hydrolysis. The catalyst with crystalline platinum is produced by mixing dihydrogen hexachloroplatinumate and black lithium-cobalt-oxide powder with the impregnation method, and then by a two-step sintering. Platinum is the major catalytic activity site, and lithium cobalt oxide is the support thereof. The manufacturing process of the present invention is simple, and can be applied to catalytic reactions or electrocatalytic reactions in fuel cells. Thereby, the present method is very practical to industry.

3 Claims, 3 Drawing Sheets

OTHER PUBLICATIONS

"Catalysts for the hydrolysis of aqueous borohydride solutions to produce hydrogen for PEM fuel cells," Palanichamy Krishnan et al. Applied Catalysis B: Environmental 77 (2007), pp. 206-214.*

"Pt and Ru dispersed on LiCoO2 for hydrogen generation from sodium borohydride solutions," Zhaolin Liu et al. Journal of Power Sources 176 (2008), pp. 306-311.*

* cited by examiner

METHOD FOR PREPARING CATALYST PLATINUM SUPPORTED ON LITHIUM COBALT OXIDE

FIELD OF THE INVENTION

The present invention relates to a method for preparing chemical materials, and particularly to a method for preparing catalyst platinum supported on lithium cobalt oxide (Pt—LiCoO$_2$) for sodium borohydride hydrolysis. The new catalyst with crystalline platinum is produced by mixing dihydrogen hexachloroplatinumate and black lithium-cobalt-oxide (LiCoO$_2$) powder with the impregnation method, and then by a two-step sintering. The major catalytic reactions occur on the platinum and the surface of the support. Not only platinum but also LiCoO$_2$ support own catalytic capability. Thereby, impregnated Pt—LiCoO$_2$ catalyst can achieve optimum catalytic efficiency.

BACKGROUND OF THE INVENTION

The synthesis method for metal-metal oxide in the prior art, such as the one disclosed in [*Int. J Hydrogen Ener.* 27, 1029 (2002)] by Toyota of Japan, uses trans-Diaamminedinitroplatinum (Pt(NO$_2$)$_2$(NH$_3$)$_2$) solution, which is a complex compound, as its precursor and adopts a two-step sintering (250° C. for 5 hours and 450° C. for 2 hours) to synthesize Pt—LiCoO$_2$. Because crystalline platinum does not exist by this process, the overall hydrolysis rate is inferior to Pt—LiCoO$_2$ with crystalline platinum. Meanwhile, the precursor Pt(NO$_2$)$_2$(NH$_3$)$_2$ can possibly release NO and NO$_2$ during sintering, causing pollution to the environment. Accordingly, the present invention adopts chloroplatinic acid (H$_2$PtCl$_6$), which a kind of metal salt, as the precursor to synthesize the catalyst Pt—LiCoO$_2$ with crystalline platinum. Not only hydrolysis efficiency will be increased, but also toxic gas will not be produced. Thereby, the present method is very practical to industry.

SUMMARY

In 1839, an English judge William Grove first proposed successful verification on feasibility of power-generating principles of fuel cells. However, the power efficiency thereof was low. After more than a hundred years of technological development, fuel cells finally were appraised as the power source of many important apparatuses in the space project of US. In addition, in 1965, fuel cells were applied officially to spaceship GEMINI V, and had helped the spaceship to finish the navigational mission with success. Thereafter in the space projects, fuel cells still bear important responsibility, and are essential tools for human beings to explore the mysteries of the cosmos.

Fuel cells convert fuels such as gasoline, alcohol, natural gas, hydrogen, and marsh gas to currents. Fuel cells can replace internal combustion engines in automobiles, batteries in notebook computers, cell phones, calculators, and power generators in cars, motorcycles, and yachts. When charging, it is only necessary to empty the container filled with the by-product water, and then to re-fill with fuels (such as alcohol). In a word, a fuel cell is a generator. It is the fourth method of generating power besides thermal power, hydropower, and nuclear power.

One kind of fuel cells uses hydrogen as the fuel and oxygen as the oxidant of a combination reaction for power generation. Such kind of fuel cell is called a hydrogen-oxygen regenerative fuel cell (RFC). Hydrogen reacts with oxygen to produce non-polluting water without exhausting pollutants such as hydrocarbon, carbon monoxide, nitride, and carbon dioxide. A hydrogen-oxygen regenerative fuel cell discharges very clean by-products almost without pollution. In addition, it is highly efficient. The structure of a fuel cell is similar to a general battery, which is composed by a cathode, an anode, and electrolyte layers therebetween. Stack and combine several cell units to construct a fuel cell. The principle of a hydrogen-oxygen regenerative fuel cell is to use hydrogen as the fuel to react with oxygen via electrochemistry reactions, and then to generate electrical power through a proton exchange membrane. The advantages thereof are high power-generating efficiency, and the by-products are heat and pure water only, which will not cause any threat to the environment and meets the requirements of an environmentally friendly vehicle. The major difference between a fuel cell and a general battery is that a fuel cell does not store electrical energy in itself. The electrical energy of a fuel cell comes from the chemical energy in the fuels. That is to say, as long as fuels are supplied continually, a fuel cell will generate power unfailingly. In other words, the structure of a fuel cell is like a general generator except that the operation of a fuel cell is quieter (even in the vicinity of an 11 MW fuel-cell power plant, the noise measured is lower than 55 dB) and cleaner (almost producing no pollution during generating power) than a generator. Taking an 11 MW fuel-cell power plant, which is the largest capacity presently, for example, by using natural gas as the fuel, the nitrogen oxide exhausted at early operation stage of the power plant was 1 ppm, and no sulfur oxide or particulate pollutant were detected. This is even cleaner and more efficient than a gas-fired power plant, which is the cleanest power plant currently.

Regardless of what kind of fuel cells is used, hydrogen is needed to be the fuel. Thereby, the development of hydrogen storage material is the key technology in the development of fuel cells. Nowadays, methods of hydrogen storage are divided into six categories:

1. Use of high-pressure steel cylinders (pressure can reach 800 bar);
2. Storing liquid hydrogen in a cryo-tank (temperature is 21 K);
3. Use of materials with large surface areas to absorb hydrogen (temperature is below 100 K), such as carbon and zeolites; the larger the surface area, the better the absorption;
4. Making hydrogen to react with metals for storing it in the vacant spaces between metal structures;
5. Making hydrogen to bond with covalent ions or ionic compounds, and storing hydrogen or hydrolysis via chemical reactions; and
6. Performing oxidizing reactions with metals with high activity (for example, water reacting with lithium, sodium, magnesium, aluminum, or zinc); in addition to commercially available high-pressure hydrogen cylinders and liquid-hydrogen storage methods, hydrogen can be stored repeatedly in nickel alloys or titanium-iron alloys of lanthanum (La) or mischmetal (Mm).

Sodium borohydride (NaBH$_4$) is one of chemical hydrogen. The chemical reaction of NaBH$_4$ with water is:

$$NaBH_{4(aq)} + 2H_2O_{(l)} \rightarrow NaBO_{2(aq)} + 4H_{2(g)} \quad \Delta H = -217 \text{ kJ}$$

The advantages of applying NaBH$_4$ in the hydrogen-supplying system of fuel cells are:

1. NaBH$_4$ solution is uninflammable;
2. NaBH$_4$ solution is relatively stable in alkaline conditions, being able to store several months without change of quality;
3. The hydrogen storage efficiency of the reaction by NaBH$_4$ solution is higher than other reactions of chemical hydrogen, and the reaction rate by NaBH$_4$ solution is easy to control;
4. The by-products of the reaction by NaBH$_4$ solution can be recycled to produce NaBH$_4$;

5. By using specific catalyst, $NaBH_4$ will produce a great amount of hydrogen;
6. The only gaseous product is vapor, which is environmentally friendly and safe; and
7. Even under the condition of 0° C., hydrogen still can be produced.

If the hydrolysis reaction by $NaBH_4$ is to be applied to the hydrogen-supplying system of fuel cells, it is necessary to increase the reaction rate in terms of catalysts. This subject is the major topic frequently discussed in the field. Modifying species (such as Ru, $Ni_xB$, Pt, or Pt-Metal oxide etc.), surface areas, amount, or synthesis methods of the catalysts, as well as catalysts plated on different substrates, all influence the reaction of producing hydrogen by $NaBH_4$.

Toyota of Japan, as disclosed in [*Int. J Hydrogen Ener.* 27, 1029 (2002)], uses trans-Diaamminedinitroplatinum (Pt $(NO_2)_2(NH_3)_2$) solution as its precursor and adopts a two-step sintering (250° C. for 5 hours and 450° C. for 2 hours) to synthesize Pt—$LiCoO_2$. Because crystalline platinum does not exist by this process, the overall hydrolysis rate is inferior to Pt—$LiCoO_2$ with crystalline platinum. Meanwhile, the precursor $Pt(NO_2)_2(NH_3)_2$ can possibly release No and $NO_2$ during sintering, causing pollution to the environment. Accordingly, the present invention adopts chloroplatinic acid ($H_2PtCl_6$), which a kind of metal salt, as the precursor to synthesize the catalyst Pt—$LiCoO_2$ with crystalline platinum. Not only hydrolysis efficiency will be increased, but also toxic gas will not be produced. Thereby, the present method is very practical to industry.

DETAILED DESCRIPTION

The present invention relates to a method for preparing chemical materials, and particularly to a method for using dihydrogen hexachloroplatinumate ($H_2PtCl_6$) as the precursor to prepare catalyst platinum supported on lithium cobalt oxide (Pt—$LiCoO_2$) for sodium borohydride hydrolysis. The new catalyst of metal-metal oxide is produced by mixing $H_2PtCl_6$ and black lithium-cobalt-oxide ($LiCoO_2$) powder with the impregnation method, and then by a two-step sintering. The major catalytic reactions occur on the platinum and the surface of the support. Not only platinum but also $LiCoO_2$ support own catalytic capability. Thereby, impregnated Pt—$LiCoO_2$ catalyst can achieve optimum catalytic efficiency. The process according to the present invention is simple, and new hydrolysis catalyst with uniform diameters can be accordingly prepared.

Preferred Embodiment

Figure 1:
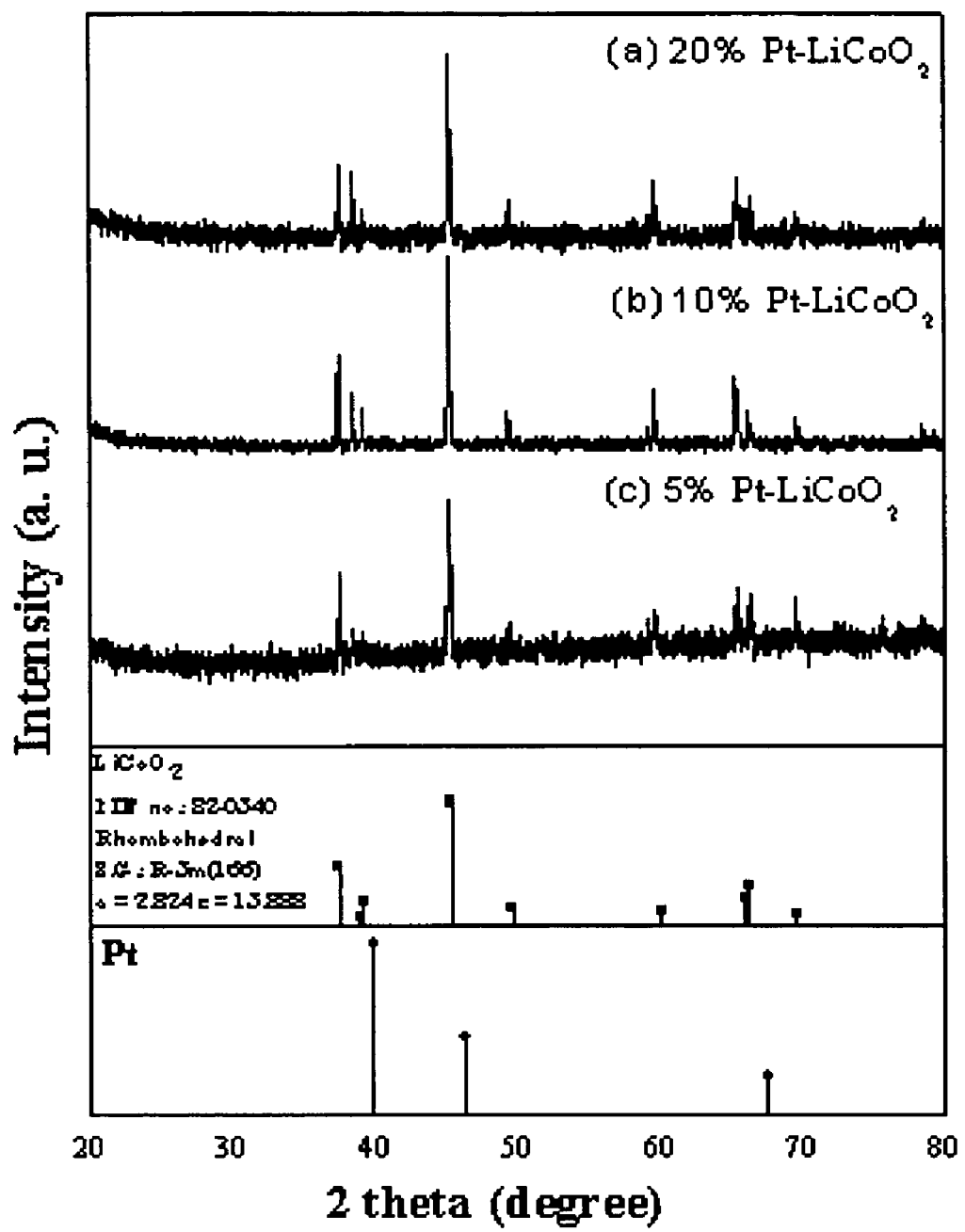
FIG. 1 is an X-ray diffraction spectrum of Pt—$LiCoO_2$ synthesized by using $Pt(NO_3)_2(NH_3)_2$ solution as the precursor (wherein the X-ray diffraction spectra of standard $LiCoO_2$ and Pt by JCPDS database are also shown in the figure)

The synthesis method for metal-metal oxide in the prior art, such as the one disclosed in [*Int. J Hydrogen Ener.* 27, 1029 (2002)], uses trans-Diaamminedinitroplatinum ($Pt(NO_2)_2(NH_3)_2$), which is a complex compound, as its precursor. First mix the $Pt(NO_2)_2(NH_3)_2$ solution and black lithium-cobalt-oxide ($LiCoO_2$) powder with the impregnation method. Then adopt a two-step sintering (250° C. for 5 hours and 450° C. for 2 hours) to synthesize Pt—$LiCoO_2$. FIG. 1 is an X-ray diffraction spectrum of Pt—$LiCoO_2$ synthesized by using $Pt(NO_3)_2(NH_3)_2$ solution as the precursor. By FIG. 1, crystalline platinum is not observed, meaning that platinum synthesized by using $Pt(NO_3)_2(NH_3)_2$ solution as the precursor will produce amorphous platinum.

Figure 2:
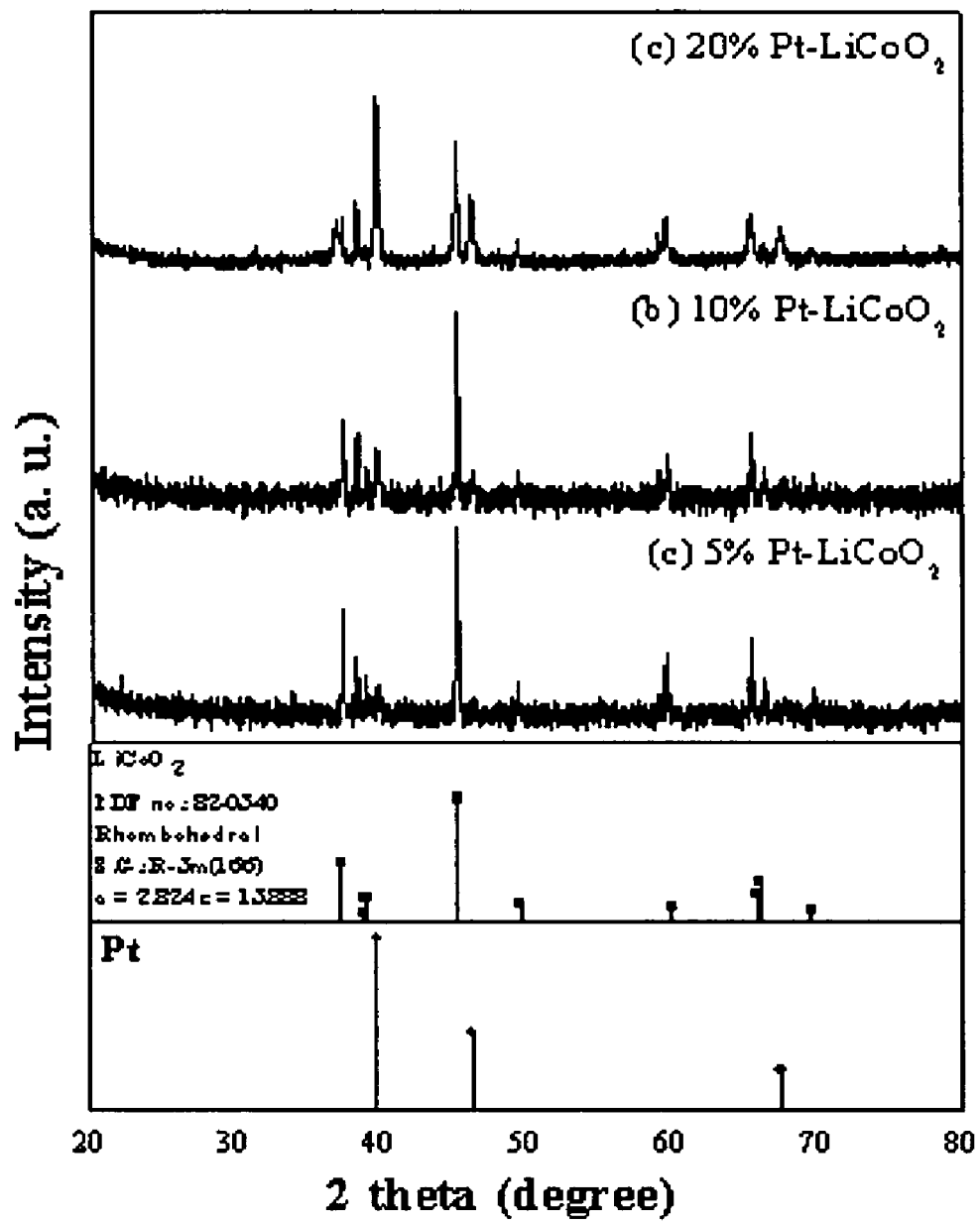
FIG. 2 is an X-ray diffraction spectrum of Pt—$LiCoO_2$ synthesized by using $H_2PtCl_6$ as the precursor (wherein the X-ray diffraction spectra of standard $LiCoO_2$ and Pt by JCPDS database are also shown in the figure)
Figure 3:
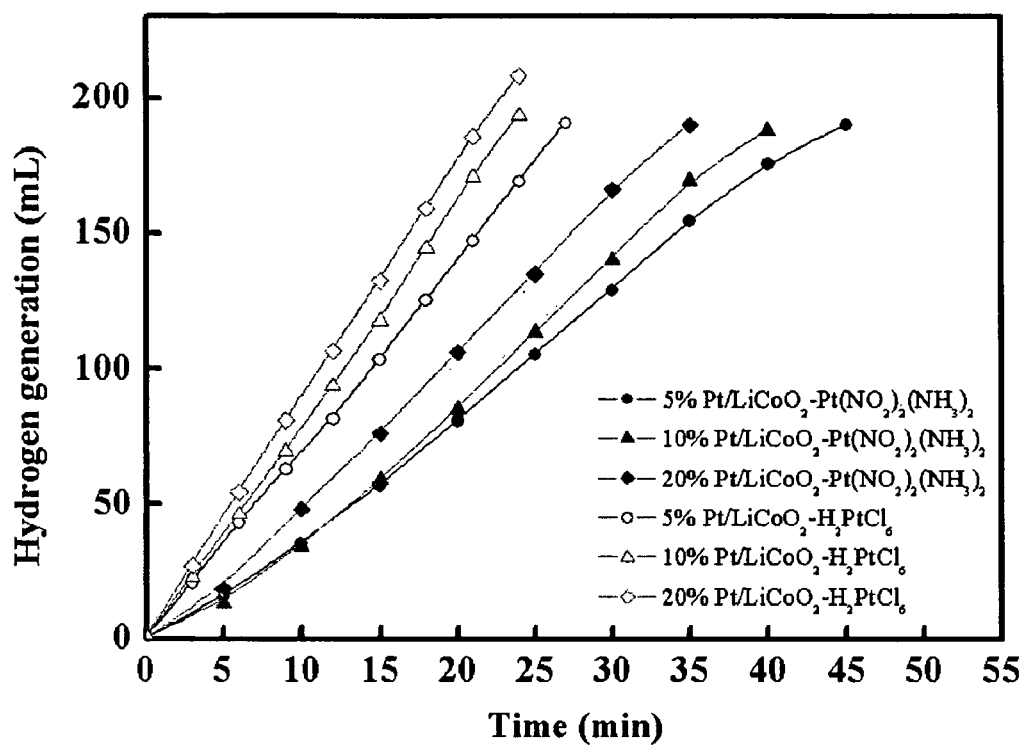
FIG. 3 is the hydrogen generation rates by impregnation method using the catalyst Pt—$LiCoO_2$ with various amount of Pt.

The present invention uses $H_2PtCl_6$ as the precursor to synthesize Pt—$LiCoO_2$. First, weigh a proper amount of $LiCoO_2$ black powder and mix with the precursor $H_2PtCl_6$ by stirring. Then put them into a supersonic vibrator. After vibrating for 30 minutes, well-mixed catalytic thick liquid will be produced. Put the well-mixed catalytic thick liquid into a cracking furnace and sinter for five hours at 250° C. in the atmosphere. After cooling, put the scraped catalytic thick liquid into a crucible. Then put the crucible into a high-temperature furnace and sinter for two hours at 450° C. in the atmosphere. After cooling, grind the catalytic grains fine with an agate crucible. Next, add de-ionized water into the grinded catalyst and continue grinding to give even finer powders. Pour the grinded mixture into an air-extracting filtering bottle. Put the filter cake into a vacuum oven to evaporate water in the filter cake. Finally, dried Pt—$LiCoO_2$ black catalytic powder is thereby produced. FIG. 2 is an X-ray diffraction spectrum of Pt—$LiCoO_2$ synthesized by using $H_2PtCl_6$ as the precursor. As shown in the figure, the present invention can produce crystalline platinum (as indicated by the arrows in FIG. 2).

In the following, the hydrolysis characteristics of $NaBH_4$ using Pt—$LiCoO_2$ prepared by two different precursors as the catalysts are compared. As shown in the figure, it is known that the hydrolysis rates of $NaBH_4$ catalyzed by the catalyst Pt—$LiCoO_2$ synthesized by using $H_2PtCl_6$ as the precursor, no matter the platinum impregnation amount is 5%, 10%, or 20%, are superior to those catalyzed by the catalyst Pt—$LiCoO_2$ synthesized by using $Pt(NO_2)_2(NH_3)_2$ as the precursor. By FIG. 1 and FIG. 2, the major difference between the catalysts Pt—$LiCoO_2$ synthesized by different precursors is if crystalline platinum is produced or not. In the catalyst structure of Pt—$LiCoO_2$, platinum plays the most important catalytic role, and is the major catalytic activity site. Thereby, it is known that the metal platinum with better crystallization will have more catalytic activity sites, which resulting in better catalytic capability for hydrolysis rate.

Furthermore, the precursor $Pt(NO_2)_2(NH_3)_2$ can possibly release NO and $NO_2$ during sintering, causing pollution to the environment. On the contrary, by using the catalyst Pt—$LiCoO_2$ with crystalline platinum and synthesized by using $H_2PtCl_6$ as the precursor, not only the hydrolysis efficiency is increased, but also no toxic gas will be produced. Thereby, the present invention is very practical to industry.

The invention claimed is:

1. A method for preparing catalyst platinum supported on lithium cobalt oxide (Pt—$LiCoO_2$) with crystalline platinum for sodium borohydride hydrolysis, consisting of:
    combining dihydrogen hexachloroplatinumate ($H_2PtCl_6$), said dihydrogen hexachloroplatinumate ($H_2PtCl_6$) being a metal salt solution, and black lithium-cobalt-oxide ($LiCoO_2$) powder to form a mixture;
    stirring said mixture;
    placing the dihydrogen hexachloroplatinumate ($H_2PtCl_6$) and black lithium-cobalt-oxide ($LiCoO_2$) powder mixture into a supersonic vibrator for 30 minutes; and
    sintering.

2. The method of claim 1, wherein the sintering is two-step with a first sintering at 250° C. and then with a second sintering between 350° C. and 650° C.

3. The method of claim 2, wherein the temperature of the second sintering is 450° C.

* * * * *